United States Patent
Vrcelj et al.

(10) Patent No.: US 9,866,815 B2
(45) Date of Patent: Jan. 9, 2018

(54) 3D OBJECT SEGMENTATION

(71) Applicant: QUALCOMM Incorporated, San Diego, CA (US)

(72) Inventors: Bojan Vrcelj, San Diego, CA (US); Young Hoon Lee, Los Angeles, CA (US); Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/866,771

(22) Filed: Sep. 25, 2015

(65) Prior Publication Data
US 2016/0196659 A1 Jul. 7, 2016

Related U.S. Application Data
(60) Provisional application No. 62/100,037, filed on Jan. 5, 2015.

(51) Int. Cl.
*G06K 9/00* (2006.01)
*G06T 7/00* (2017.01)
(Continued)

(52) U.S. Cl.
CPC ......... *H04N 13/0203* (2013.01); *G01B 11/22* (2013.01); *G06K 9/00214* (2013.01);
(Continued)

(58) Field of Classification Search
CPC ........... G06K 9/00201; G06K 9/00214; G01B 11/22; G01B 11/24; G06T 7/50
See application file for complete search history.

(56) References Cited

U.S. PATENT DOCUMENTS 6,801,662 B1 * 10/2004 Owechko ........... G06K 9/00201
382/103
9,424,470 B1 * 8/2016 Hinterstoisser .... G06K 9/00664
(Continued)

FOREIGN PATENT DOCUMENTS

WO 9906956 A1 2/1999
WO 2013174671 A1 11/2013

OTHER PUBLICATIONS

D. Gallup, J. M. Frahm and M. Pollefeys, "Piecewise planar and non-planar stereo for urban scene reconstruction," 2010 IEEE Computer Society Conference on Computer Vision and Pattern Recognition, San Francisco, CA, 2010, pp. 1418-1425. doi: 10.1109/CVPR.2010.5539804.*
(Continued)

*Primary Examiner* — Utpal Shah
(74) *Attorney, Agent, or Firm* — Blakely, Sokoloff, Taylor & Zafman

(57) ABSTRACT

Disclosed are a system, apparatus, and method for 3D object segmentation within an environment. Image frames are obtained from one or more depth cameras or at different times and planar segments are extracted from data obtained from the image frames. Candidate segments that comprise a non-planar object surface are identified from the extracted planar segments. In one aspect, certain extracted planar segments are identified as comprising a non-planar object surface, and are referred to as candidate segments. Confidence of preexisting candidate segments are adjusted in response to determining correspondence with a candidate segment. In one aspect, one or more preexisting candidate segments are determined to comprise a surface of a preexisting non-planar object hypothesis. Confidence in the non-planar object hypothesis is updated in response to determining correspondence with a candidate segment.

30 Claims, 11 Drawing Sheets

(51) Int. Cl.
| | |
|---|---|
| *H04N 13/02* | (2006.01) |
| *G06K 9/34* | (2006.01) |
| *G06K 9/62* | (2006.01) |
| *G01B 11/22* | (2006.01) |
| *G06T 7/50* | (2017.01) |
| *G06T 7/11* | (2017.01) |
| *G06T 7/12* | (2017.01) |
| *G06T 7/13* | (2017.01) |
| *G06T 7/136* | (2017.01) |
| *H04N 13/00* | (2006.01) |

(52) U.S. Cl.
CPC ............. *G06K 9/34* (2013.01); *G06K 9/6215* (2013.01); *G06T 7/11* (2017.01); *G06T 7/12* (2017.01); *G06T 7/13* (2017.01); *G06T 7/136* (2017.01); *G06T 7/50* (2017.01); *G06T 2207/10012* (2013.01); *G06T 2207/10021* (2013.01); *G06T 2207/10028* (2013.01); *G06T 2207/30244* (2013.01); *H04N 2013/0092* (2013.01)

(56) References Cited

U.S. PATENT DOCUMENTS

2006/0285755 A1* 12/2006 Hager ................ G06K 9/00208
382/224
2014/0368504 A1    12/2014 Chen et al.
2015/0279087 A1* 10/2015 Myers ..................... G06F 17/15
345/420

OTHER PUBLICATIONS

International Search Report and Written Opinion—PCT/US2015/067133—ISA/EPO—dated Apr. 26, 2016, 13 pages.

Kuan D.T, "Three-dimensional Vision System for Object Recognition," Proceedings of the Spie—The International Society for Optical Engineering USA, 1984, vol. 449, pp. 366-372, XP001482906, ISSN: 0277-786X.

Stamos J., et al., "3-D Model Construction Using Range and Image Data," Proceedings 2000 IEEE Conference on Computer Vision and Pattern Recognition, CVPR 2000, Hilton Head Island, Sc, Jun. 13-15, 2000; [Proceedings of the IEEE Computer Conference on Computer Vision and Pattern Recognition], Los Alamitos, CA IEEE Comp., Jun. 13, 2000 (Jun. 13, 2000), pp. 531-536, XP001035614, ISBN: 978-0-7803-6527-8.

Jia Z., et al., "3D-Based Reasoning with Blocks, Support, and Stability," IEEE Conference on Computer Vision and Pattern Recognition (CVPR), 2013, pp. 1-8.

Weinshall D., et al., "Object Detection in Multi-view 3D Reconstruction Using Semantic and Geometric Context," ISPRS Annals of the Photogrammetry, Remote Sensing and Spatial Information Sciences, 2013, vol. II-3/W3, CMRT13—City Models, Roads and Traffic 2013, Nov. 12-13, 2013, pp. 97-102.

* cited by examiner

3D OBJECT SEGMENTATION

CROSS-REFERENCE TO RELATED APPLICATIONS

This application claims the benefit of U.S. Provisional Application No. 62/100,037 filed on Jan. 5, 2015, and expressly incorporated herein by reference.

FIELD

The subject matter disclosed herein relates generally to computer vision object segmentation.

BACKGROUND

Volumetric reconstruction is the process of grabbing or extracting precise 3D models of objects and/or environments. For example, 3D volumetric reconstruction may create models with thousands or more elements (e.g., planar segments or other geometric components) based on surfaces detected from the real world object. However, 3D volumetric reconstruction in general applies to an entire scene or environment in a camera's viewpoint and does not selectively distinguish between individual objects during reconstruction. For example, when reconstructing a scene or environment with 3D volumetric reconstruction, an entire scene would be reconstructed, potentially wasting valuable system resources on aspects of the scene that may not be required for a particular application. Furthermore, expending resources on reconstructing an entire scene may compromise the quality of final reconstruction result.

Additionally, determining the 3D volumes occupied by objects has other important applications including those in robotics and navigation/automated driving systems for example.

Therefore, improved techniques for segmenting 3D objects in an environment is desirable.

SUMMARY OF THE DESCRIPTION

Embodiments disclosed herein may relate to a method for 3D object detection. The method may include extracting a first plurality of planar segments from image frame depth data; identifying, from the extracted first plurality of planar segments, one or more first candidate segments comprising a non-planar object surface; updating a confidence of a preexisting candidate segment in response to determining correspondence with the one or more first candidate segments; determining the preexisting candidate segment comprises a surface of a first preexisting non-planar object hypothesis; and updating a confidence of the first preexisting non-planar object hypothesis in response to determining correspondence with the one or more first candidate segments.

Embodiments disclosed herein may relate to a device to provide 3D object detection. The device may include instructions for extracting a first plurality of planar segments from image frame depth data; identifying, from the extracted first plurality of planar segments, one or more first candidate segments comprising a non-planar object surface; updating a confidence of a preexisting candidate segment in response to determining correspondence with the one or more first candidate segments; determining the preexisting candidate segment comprises a surface of a first preexisting non-planar object hypothesis; and update a confidence of the first preexisting non-planar object hypothesis in response to determining correspondence with the one or more first candidate segments.

Embodiments disclosed herein may relate to a machine readable non-transitory storage medium having stored therein program instructions that are executable by a processor to: extract a first plurality of planar segments from image frame depth data; identify, from the extracted first plurality of planar segments, one or more first candidate segments comprising a non-planar object surface; update a confidence of a preexisting candidate segment in response to determining correspondence with the one or more first candidate segments; determine the preexisting candidate segment comprises a surface of a first preexisting non-planar object hypothesis; and update a confidence of the first preexisting non-planar object hypothesis in response to determining correspondence with the one or more first candidate segments.

Embodiments disclosed herein may relate to an apparatus for performing 3D object detection. The apparatus may include means for identifying, from the first candidate segments, one or more second candidate segments without correspondence to any preexisting candidate segments; means for determining correspondence between the one or more second candidate segments and a second non-planar object hypothesis; means for updating a confidence in the second non-planar object hypothesis in response to determining correspondence between the one or more second candidate segments and a second non-planar object hypothesis; and means for adding the one or more second candidate segments to a list of segments comprising the second non-planar object hypothesis.

Other features and advantages will be apparent from the accompanying drawings and from the detailed description.

DETAILED DESCRIPTION

Figure 1:
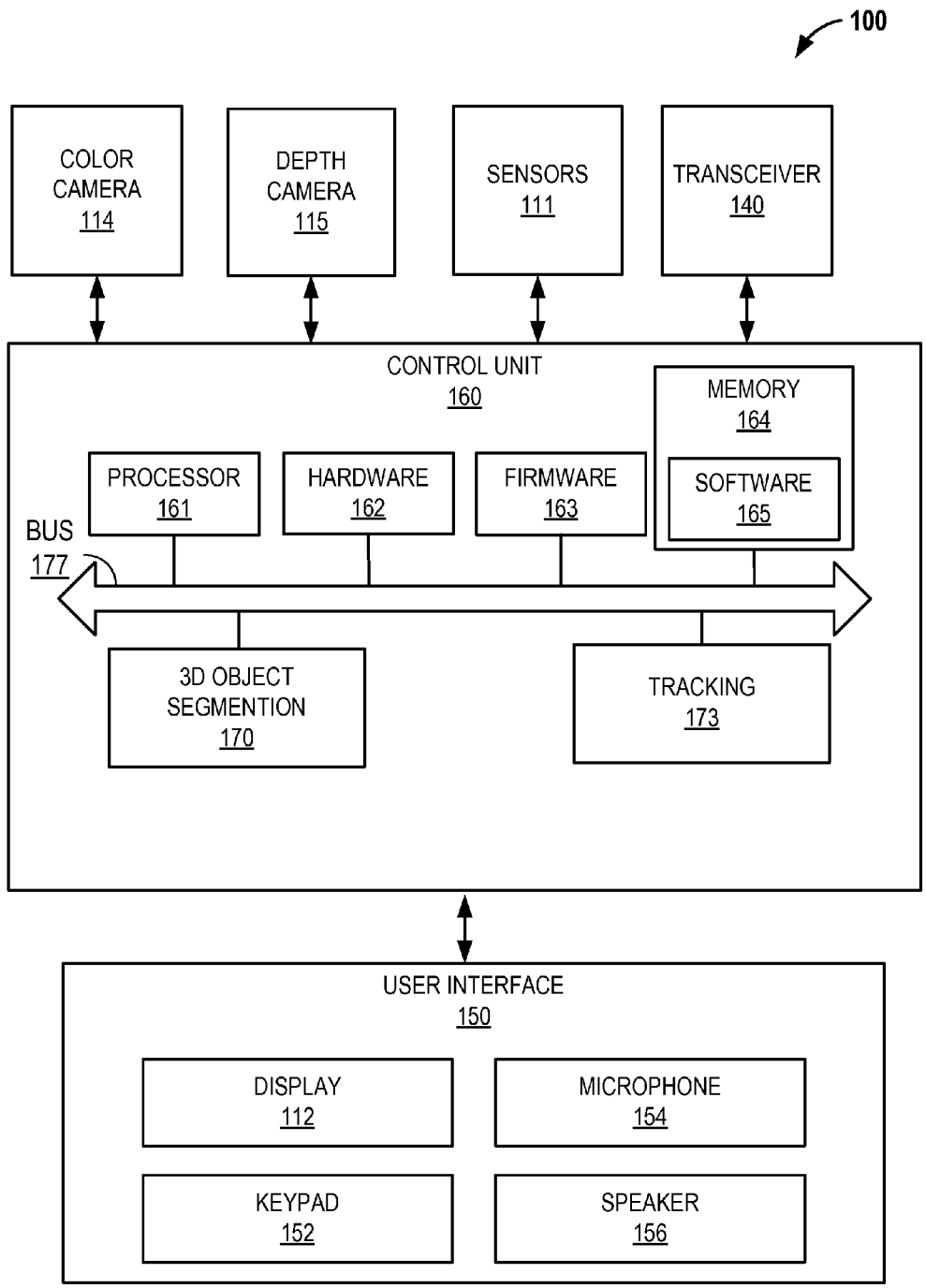
FIG. 1 is a block diagram of a device to perform 3D Object Segmentation (3DOS), in one embodiment.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

One method to distinguish between objects is with a brute force method of exhaustive 3D volumetric reconstruction of an entire scene. By determining comprehensive and dense 3D information about voxels in space, segmentation techniques may be applied to determine which voxels are objects. However, this brute force method is computationally intensive and may produce a large number of errors.

In one embodiment, a 3D object segmentation technique (referred to herein as 3DOS), estimates planar segments and tracks camera position and orientation (pose). By utilizing planar segments and a camera pose from multiple vantage points, a confidence estimate of 3D objects in a scene may be determined. Non-planar (3D) objects may be detected in a scene using depth measurements. 3DOS can utilize planar segment and object volume filtering over multiple frames from different times or different cameras to determine likelihood of an object being present at a given location and to refine object location. In one embodiment, 3DOS extracts planar segments in each frame and uses the extracted segments to identify possible object locations and volumes. 3DOS can use the area of the extracted planar segments as a classifying parameter to determine if the region contains a non-planar object. 3DOS can find planar segments through a volume occupancy and planar segment support/voting mechanism. 3DOS can update the confidence or likelihood of an object occupying a certain volume by observing appropriate surfaces or segments that support the presence of the respective 3D object.

In one embodiment, a planar segment contains a list of (u,v)—pixel coordinates in the input frame of pixels which have been found to conform well with a planar equation—up to a small predetermined error. Corresponding pane parameters for a planar segment may be three real numbers. A planar segment may also planar segment may also contain a corresponding list of (x,y,z) coordinates in world coordinate system which correspond to (u,v) pixel coordinates. These two are uniquely related given camera intrinsics and extrinsics, as well as the measured depth values corresponding to pixels (ui,vi).

In one embodiment, a boundary/border in image plane is another set of pixel coordinates (u_b,v_b) (a subset of all pixel coordinates (u,v) belonging to a segment) which outline the planar segment. The pixel coordinates may lie on the boundary between the planar segment and other pixels in a frame and can be found uniquely given a complete list (u,v). Therefore, a planar segment may be also considered a plane (given by 3 real numbers) and a boundary, or a complex polygon describing the extends of the plain contained in the segment. The planar segment may also contain a convex hull in 2D (u_h,v_h) or in 3D (x_h,y_h,z_h) further describing a segment boundary.

FIG. 1 is a block diagram of a device to perform 3D Object Segmentation (3DOS), in one embodiment. The system may be a device 100, which may include a general purpose processor 161, 3DOS module 170, and a memory 164. The device 100 may also include a number of device sensors coupled to one or more buses 177 or signal lines further coupled to at least the 3DOS module 170. Module 170 is illustrated separately from processor 161 and/or hardware 162 for clarity, but may be combined and/or implemented in the processor 161 and/or hardware 162 based on instructions in the software 165, and the firmware 163. Control unit 160 can be configured to implement methods of performing Object segmentation as described below. For example, the control unit 160 can be configured to implement functions of the mobile device 100 as described below with regards to FIG. 2, FIG. 4A, and FIG. 4B.

Device 100 may be a: mobile device, wireless device, cell phone, augmented reality (AR) device, personal digital assistant (PDA), wearable (e.g., eyeglasses, watch, head wear, or similar coupled to a body) device, mobile computer, tablet, personal computer, laptop computer, data processing device/system, or any type of device that has processing capabilities.

In one embodiment, device 100 is a mobile/portable platform. Device 100 can include a means for capturing an image, such as color camera 114, depth camera 115, and may optionally include sensors 111, such as accelerometers, gyroscopes, electronic compass, or other similar motion sensing elements. The device 100 may also capture images on a front or rear-facing camera (e.g., camera 114).

In general, color camera 114 may be a color or grayscale camera, which provide "color information," while "depth information" may be provided by a depth camera (e.g., depth camera 115). The term "color information" as used herein refers to color and/or grayscale information. In general, as used herein, a color image or color information may be viewed as comprising 1 to N channels, where N is some integer dependent on the color space being used to store the image. For example, an Red, Blue and Green (RGB) image comprises three channels, with one channel each for Red, Blue and Green information.

Depth information may be captured in a variety of ways using depth cameras (e.g., depth camera 115). The term "depth camera" is used to refer to functional units that may be used to obtain depth information independently from color camera 114. For example, depth camera 115 may be physically installed in a same general location as camera 114, however depth camera 115 may operate at a different frequency or frame rate from camera 114. In some embodiments, the depth camera 115 and camera sensor 114 may capture different scenes although triggered or initialized at the same or approximately equal time.

As a further example, depth camera 115 may take the form of a light source coupled to device 100. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In yet another embodiment, the stereo sensors may refer to a pair (or multiple) of optical (e.g., RGB or grayscale cameras) calibrated and equipped with an algorithm for calculating depth from pairs (multiples) of RGB/grayscale images.

In some embodiments, device 100 may comprise multiple cameras, such as dual front cameras and/or a front and rear-facing cameras, which may also incorporate various sensors. In some embodiments, cameras may be capable of capturing both still and video images. In some embodiments, cameras may be RGB with depth (RGBD) or stereoscopic video cameras capable of capturing images at 30 frames per second (fps). In one embodiment, images captured by cameras may be in a raw uncompressed format and may be compressed prior to being processed and/or stored in memory 164. In some embodiments, image compression may be performed by processor 161 using lossless or lossy compression techniques.

In some embodiments, processor 161 may also receive input from sensors 111. Sensors 111 may comprise 3-axis accelerometer(s), 3-axis gyroscope(s), and/or magnetometer(s). Sensors 111 may provide velocity, orientation, and/or other position related information to processor 161. In some embodiments, sensors 111 may output measured information associated with the capture of each image frame by camera 114 and depth camera 115. In some embodiments, the output of sensors 111 may be used in part by processor 161 to determine a pose of cameras 114 and depth camera 115 and/or device 100.

The pose of camera 115 (also described herein as "camera viewpoint") refers to the position and orientation of the depth camera 115 relative to a frame of reference. In some embodiments, camera pose may be determined for 6-Degrees Of Freedom (6DOF), which refers to three translation components (which may be given by X,Y,Z coordinates of a frame of reference) and three angular components (e.g., roll, pitch and yaw relative to the same frame of reference).

In some embodiments, the pose of camera 114 and/or device 100 may be determined and/or tracked by processor 161 using a visual tracking solution based on images captured by camera 114. In one embodiment, 3DOS implements one or more of a number of different tracking solutions. For example, the camera sensor aide for pose tracking may be received from RGB camera 114, or from depth camera 115 itself. In some embodiments, when the depth camera 115 is an active sensor, a projected pattern is used to estimate depth, this sensor (115) is used itself to track the pose of the device 100. If however 115 is a passive sensor and consists of two RGB/grayscale cameras paired in the stereo pair, then 114 typically does not exist by itself, and may be one of these two cameras. In those situations, RGB from one of the 2 cameras and/or depth information derived from the stereo pair may be used for camera tracking purposes. Tracking module 173 running on processor 161 may implement and execute computer vision based tracking, model-based tracking, Iterative Closest Point (ICP), and/or Simultaneous Localization And Mapping (SLAM) methods. ICP may be the tracking method of choice if the tracking is done based on depth data only, and SLAM may be the tracking method of choice if the tracking is done primarily based on RGB/grayscale data by itself or combined with depth data. For example, SLAM refers to a class of techniques where a map of an environment, such as a map of an environment being modeled by device 100, is created while simultaneously tracking the camera's pose relative to that map. In some embodiments, the methods implemented by Tracking module 173 may be based on color or grayscale image data captured by camera 114 and may be used to generate estimates of 6DOF pose measurements of the camera. In some embodiments, the output of sensors 111 may be used to estimate, correct, and/or otherwise adjust the estimated pose. Further, in some embodiments, images captured by camera 114 and 115 may be used to recalibrate or perform bias adjustments for sensors 111.

The device 100 may further include a user interface 150 that includes a means for displaying an augmented reality image and bounding shape, such as the display 112. The display may be physically part of the device 100, or the information needed for rendering may be transmitted from the device 100 to an independent and detached display device (such as a monitor, AR glasses, etc.) The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

The device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user carries their portable device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In one embodiment, 3DOS can perform SLAM, ICP, or other tracking and mapping of a 3D map in 6DOF. Features observed from keyframes may be integrated into the 3D map. 6DOF tracking can use the feature point associations to determine the camera position and orientation (i.e., pose) related to a respective camera image. 6DOF mapping can also update/maintain the 3D Map. As discussed above, the 3D Map maintained by SLAM, ICP, or other system may contain 3D feature points triangulated from two or more keyframes. For example, keyframes may be selected from an image or video stream or feed to represent an observed scene. For every keyframe, 3DOS can compute a respective 6DOF camera pose associated with the image. 3DOS may also chose to only perform planar and object segmentation on these keyframes. 3DOS can determine camera pose by projecting features from the 3D map into an image or video frame and updating the camera pose from verified 2D-3D correspondences.

In one embodiment, depth data is processed and information about the regions in space occupied by one or more 3D objects (e.g., also described herein simply as "objects") is provided. 3D objects as used herein are non-planar volumes in space or volumes small enough (e.g., within a configurable threshold) to be considered by 3DOS as non-planar.

In one embodiment, 3DOS processes planar segments detected from multiple viewpoints in order to effectively filter out erroneous or irrelevant planar segments. For example, a single depth image may be sufficient to extract a planar segment and determine the size of the planar segment, however a single frame may not contain enough data to determine whether an object is behind the planar segment. One reason why a planar segment may not indicate an object is due to noisy depth data, such as ripples in the depth values in an otherwise flat surface. Ripples may produce one or two planar segments that are really not in a scene. Also, a large planar segment may be erroneously segmented into two or more smaller planes that may be segmented as separate objects. Therefore, as described herein, 3DOS can process multiple points of view to gain confidence that an object actually occupies some volume in space.

In one embodiment, a plurality of planar segments and objects that are non-planar and occupy space in the scene or environment are visually segmented by bounding boxes or shapes. In one embodiment, a bounding shape, described herein as a bounding box surrounding the 3D object is an output in response to the processing of the depth data. In some embodiments, the shape may be any geometric shape used to separate the 3D object from its surrounding environment (e.g., a sphere, cylinder, or other shape). The bounding box as described herein is a description of a volume in 3D space occupied by an object.

In some embodiments, a module such as the 3D Object Segmentation module described herein segments out objects within the scene or environment so that further processing may be performed on particular selected objects. For example, from output of 3DOS through a user interface or other means, a user or process can select which object is most relevant to the task at hand and focus on that particular object while ignoring or lowering priority of the other objects in the scene or environment. For example, the rest of the objects within a scene or environment may be used for tracking but not necessarily a focus of reconstruction for a 3D map or model.

In some embodiments, 3DOS may a front end for a separate object detection system by matching detected objects to an existing object in an object database of the separate object detection system. For example, in robotics or computer assisted car navigation while the camera pans/moves to detect objects of particular importance/relevance.

In some embodiments, a 3DOS bounding shape provides dimensions of each bounded object. With the object's dimensions, 3DOS (or a separate application or module) can than interface or query a database to filter objects that match or don't match expected dimensions of a target object. For example, in automated driving applications, a stoplight may have expected dimensions, such that trees, or other road objects can be properly excluded as being larger, smaller, or otherwise not matching the structure of a stoplight (e.g., rectangular with particular dimensions). Also, in another example application in a robotic assembly line, a robot may search for a part with a specific size among parts of other/different sizes and can use the dimensions calculated by the bounding box to help match or filter object hypotheses.

Figure 2:
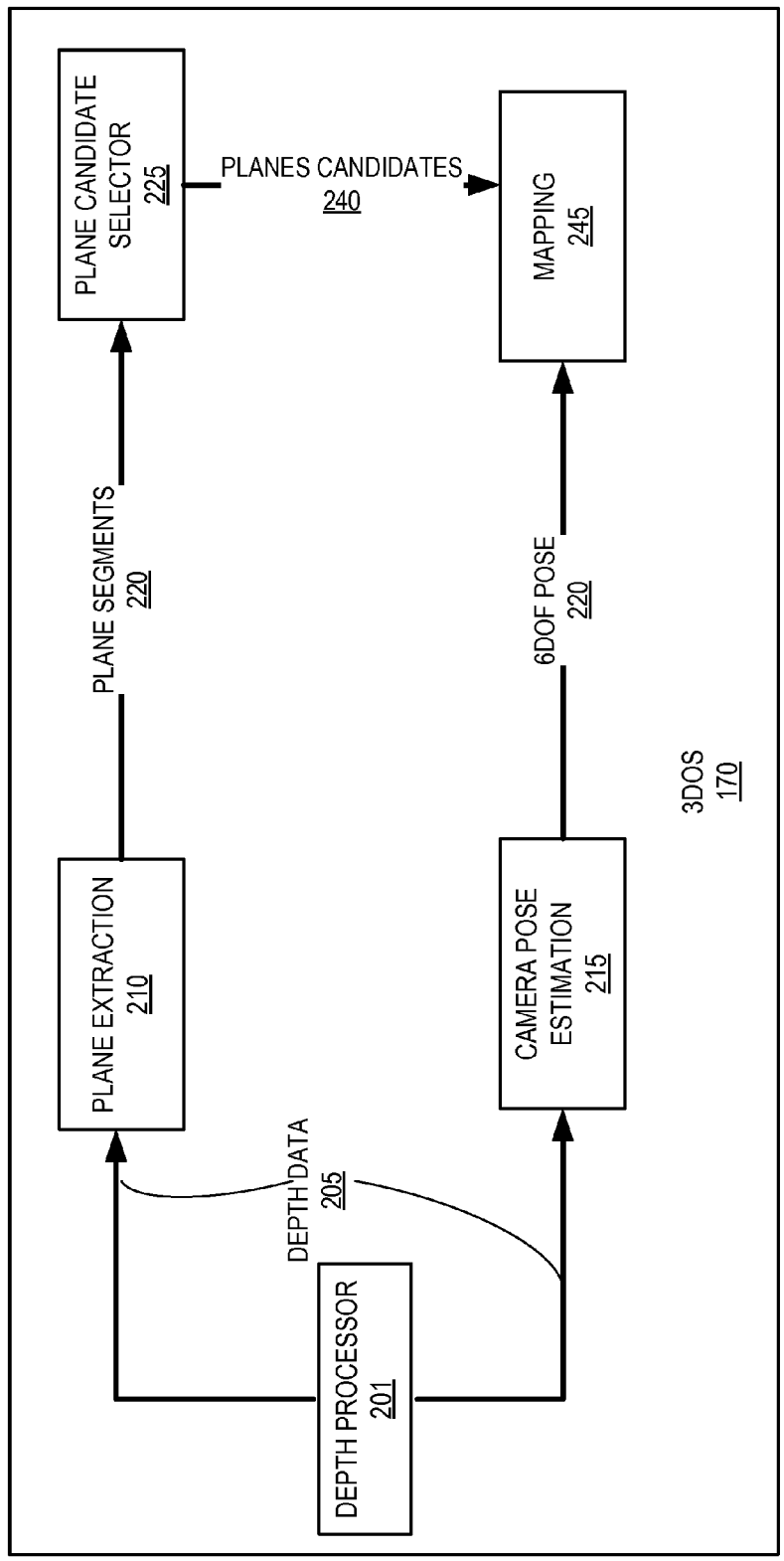
FIG. 2 is a device diagram of a module or engine to perform 3DOS, in one embodiment.

FIG. 2 is a block diagram of a module or engine to perform 3DOS, in one embodiment. Depth Processor 201 can send depth data 205 from a variety of sources as described above with regards to FIG. 1. For example, Microsoft Kinect™ sensors, active depth sensors, or passive sensors like stereo camera pair can provide depth data for a scene or environment. Depth data may be a camera image with each pixel in the image representing a distance from the camera. Depth data may be a point cloud in 3D space or may be referred to as 2.5D that provides for depth in one of the dimensions.

Figure 3A:
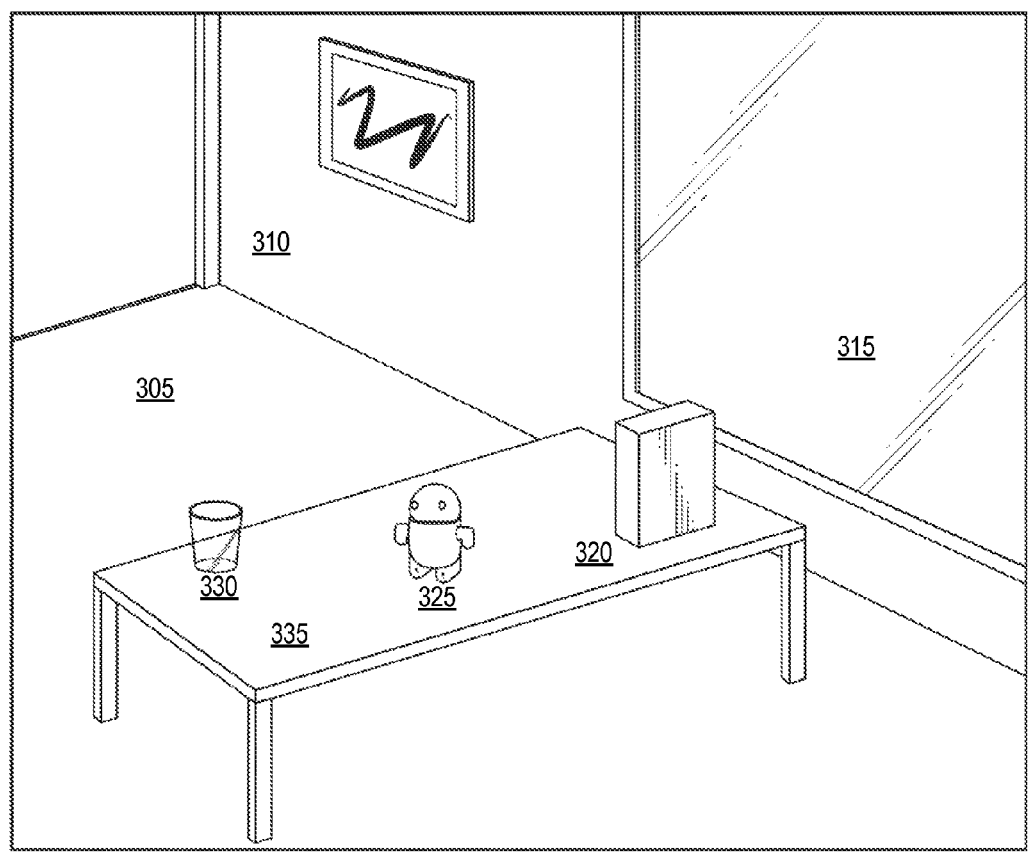
FIG. 3A illustrates a scene with sections of varying size and orientation, in one embodiment.

In one embodiment, Plane Extraction module 210 receives depth data and outputs planar segments 220 to Planes Candidate Selector 225. Plane Extraction module 210 may detect planes oriented in 3D space to segment out these planes into planar segments. For example, FIG. 3A illustrates a scene with sections 205-330 of varying size and orientation, in one embodiment. For example, with the depth data 205, the size of each planar segment is known and 3DOS can compute the area of each segment (e.g., in square meters or other configurable measurement). In one embodiment, 3DOS (e.g., via Plane Extraction module 210) processes the depth data 205 to find planar segments within a scene or frame. For example, for depth data from an average indoor scene, 3DOS may segment out large and small planar segments from surfaces of various objects within the environment. Small objects such as Cup 330, Toy 325, and Box 320 may comprise multiple relatively small planar segments (surfaces). For example, extraction of depth data associated with Cup 330 may result in a plurality of planar segments approximating the curved outside surface seen from a side angle. 3DOS distinguishes between large planar segments (e.g., surfaces such as walls such as 310, floors such as 305, windows or doors such as 315, and table tops such as 335) and non-planar objects that occupy space as a 3D object (e.g., Cup 330, Toy 325, and Box 320) as part of plane extraction. For example planes may be filtered according to one or more shape or size thresholds. As a result of extraction from the depth data 205, Plane Extraction module 210 outputs planar segments 220.

Planes Candidate Selector module 225 receives the planar segments 220 and processes them to determine planes/objects candidates 240. In one embodiment, Planes Candidate Selector module 225 filters out large planar segments according to a size threshold filter. For example, large planar segments may be removed as plane candidates for consideration while the small planar segments are maintained. For example, Planes Candidate Selector module 225 may filter out table top 335, floor 305, and wall section 310. In some embodiments, when a window is difficult to obtain depth data, area 315 may not contain any depth data. Size of planar segments may be determined by absolute area (e.g., compared to displayed or on-screen area) threshold. For example, actual surface area is calculated irrespective of the distance from the camera.

Actual area threshold may be set as a configuration parameter. For example, the parameter may set a threshold to consider planes larger than 1" squared or smaller than 50" squared, or any other dimension limitation. Area threshold may be set on a per plane basis.

In some embodiments, Planes Candidate Selector module 225 may exclude or filter planar segments according to the principle dimension ratio of the planar segment. The area ratio threshold may also be set as a configuration parameter. For example, if the plane resembles an ellipse the ratio may be determined according to the principle axis of the ellipse. Ratios that indicate a most dominant direction is much larger than the second dominant direction may be rejected or filtered from candidate selection in some embodiments. For example, accuracy of bounding output may be increased when the Planes Candidate Selector module 225 can focus on detection of well-rounded objects (e.g., approximately resembling cubes).

In one embodiment, Planes Candidate Selector module 225 keeps track of planes and objects separately and can associate/merge multiple planar segments together as an object hypothesis. For example, Planes Candidate Selector module 225 can observe two planar segments in the same frame creates a volume. Planes Candidate Selector module 225 can infer that by the orientation (e.g., normals) of two adjacent planes, by their size, and where the planes are in space that the planes support the hypothesis for an object hypothesis having a defined volume. For example, if by extending planar segments there exists an intersection in that volume space, the two planar segments may be merged as an object hypothesis. Initially, no preexisting object hypotheses exist (e.g., no objects are known to the system), however when multiple planar segments are determined to support (also described herein as "voting") for a volume, an object hypothesis is created. When an object hypothesis is determined, 3DOS (e.g., Planes Candidate Selector module 225) may switch from tracking individual planar segment candidates to performing data association for the detected planar segments.

In one embodiment, Mapping module 245 receives the planes candidates 240 as well as the 6DOF pose 230 from Camera Pose Estimation module 215 and outputs a bounding box as a description of a volume in 3D space occupied by an object. Each bounding box may be defined by vertices in space, and each scene or environment may have a plurality of bounding boxes that are output. What is performed on the bounding box data may depend on the particular application. For example, the bounding boxes may be used to detect or track objects in time. In some embodiments, the bounding boxes are used to facilitate 3D reconstruction for the particular objects in interest in the scene. For example, a user may select from a number of bounding boxes to focus reconstruction on a particular object while bypassing other objects.

Figure 3B:
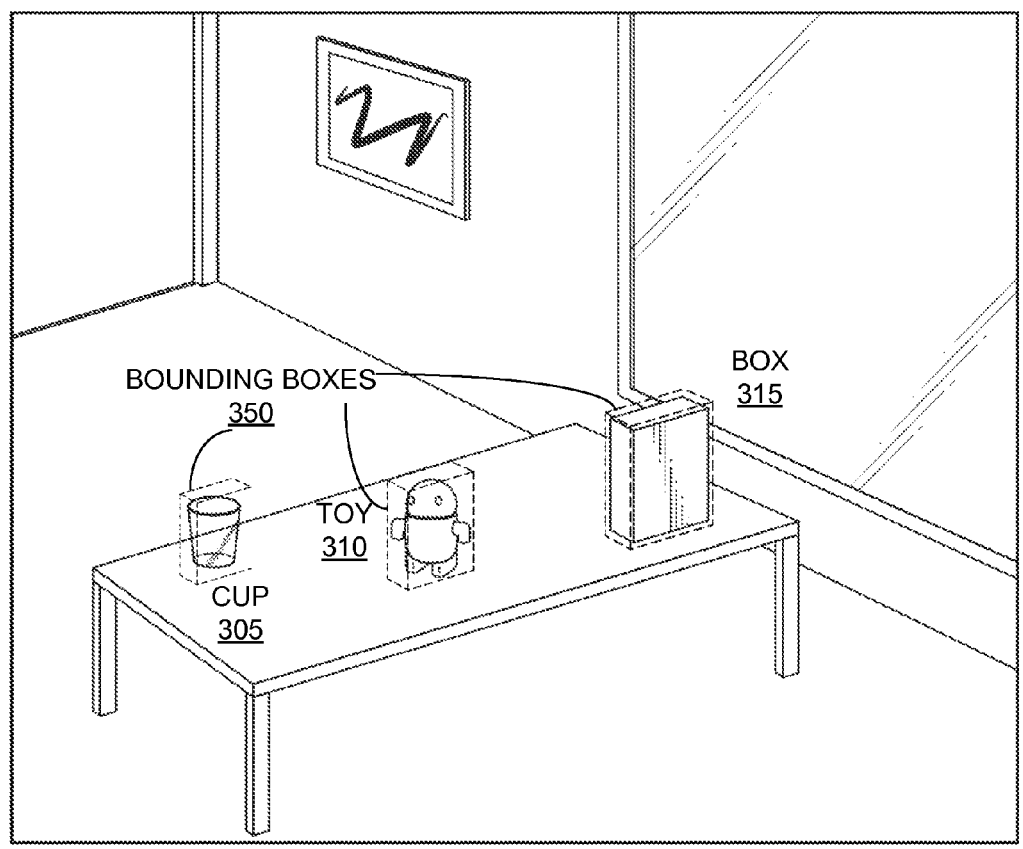
FIG. 3B illustrates an example bounding box implementation for the scene of FIG. 3A, in one embodiment.

FIG. 3B illustrates an example bounding box implementation for the scene of FIG. 3A, in one embodiment. A bounding box is given by a center in the center of the box, the 3 lengths of the sides and a rotation matrix specifying the direction of the 3 main directions of the box. This is may also referred to as an oriented bounding box, because it can take any orientation to fit an object more closely. Other systems/applications may use other similar representations, like a center and three vertices which define the three sides of the Bounding Box. In one embodiment, Mapping module 245 produces an estimation of the bounding boxes 350. This Mapping module 245 may be in addition to other mapping procedures happening within the system, such as SLAM.

In one embodiment, planar segments are used to infer a confidence there is a volume behind the planar segments which is occupied by an object. In one embodiment, 3DOS can estimate whether two or more planar segments are likely to support or form a volume.

Figure 4A:
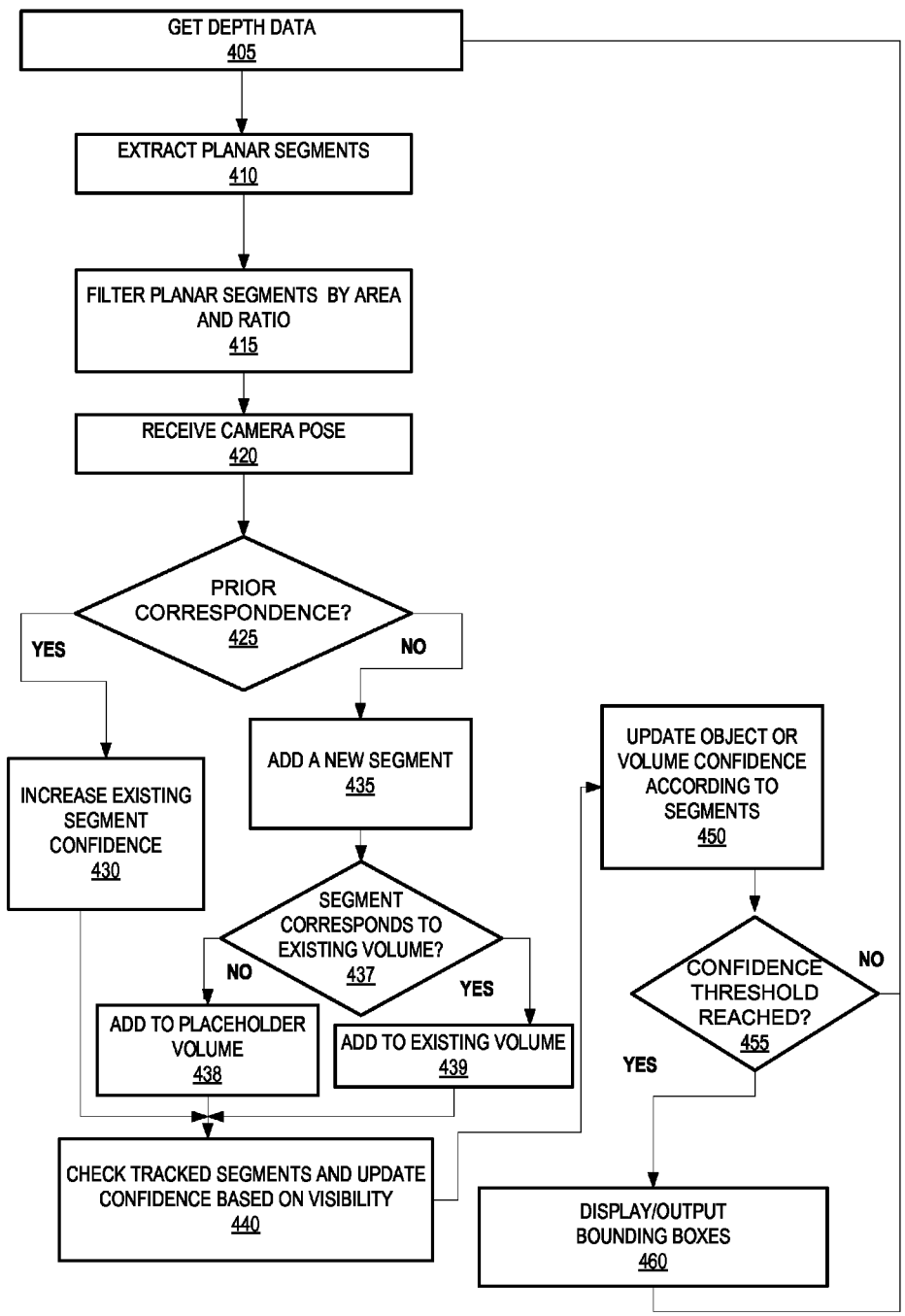
FIG. 4A is a block diagram of a method to perform 3DOS, in one embodiment.

FIG. 4A is a block diagram of a method for performing 3DOS, in one embodiment. At block 405, the embodiment (e.g., as performed by device 100 implementing 3DOS as described herein) gets depth data. For example, depth data may be retrieved or obtained from a dedicated depth sensor (e.g., depth camera 115) or from stereo color cameras (e.g., color camera 114) as introduced above with respect to FIG. 1. 3DOS may also retrieve intrinsic camera data associated with the respective camera(s). For example, intrinsic camera data may include focal length or other properties of the respective camera.

At block 410, the embodiment extracts planar segments from the depth data. For example, the planar segment extraction may be performed with any number of known algorithms, such as a greedy algorithm to extract small as well as large segments.

At block 415, the embodiment optionally filters planes by area and ratio. In one embodiment, 3DOS may exclude planes which are outside of a size threshold or do not meet a predetermined dimension ratio. For example, if a plane is large like a wall or too small to be an object then both are excluded. Filtering may remove random errors that create fictitious planes.

At block 420, the embodiment retrieves or obtains camera position and orientation (pose). For example, the embodiment may obtain camera pose from a SLAM, ICP, or other type of tracking system.

At block 425, the embodiment determines if a prior planar segment correspondence exists with the current planar segment. In one embodiment, extracted planar segments are visible according to the plane normal and the camera viewpoint. In one embodiment, if the segment is obtained from the current depth frame, the segment will be visible. For example, camera pose should not contradict the extracted plane normal by definition when both correspond to the same frame.

In one embodiment, 3DOS may check whether a previously acquired planar segment is visible by referencing prior candidate segments stored in memory (and extracted in previous frames).

In one embodiment, if the planar segment is not visible, the planar segment may be discarded or ignored and 3DOS restarts with new depth data at block 405, or processes a new planar segment again at block 425 if other segments are queued to test for visibility.

If there is no planar segment correspondence, the embodiment continues to block 435, and the current segment is added as a new segment to the universe of all known/discovered segments. Otherwise, if the embodiment determines a prior correspondence does exist with a segment that is known/discovered previously, the existing segment confidence (e.g., a confidence that the segment exists) is increased and the embodiment continues to block 440 which checks tracked segments and updates confidence based on visibility. In one embodiment, updating segment confidence levels may directly affects bounding boxes to which these segments are declared as "supporting", and the confidence levels of supporting bounding boxes/occupied volumes may also be updated.

If the embodiment determined at block 435 that a new segment is added to the known/discovered segments, the embodiment tests whether the new segment corresponds to an existing volume at block 437.

If the segment does correspond to an existing volume, the embodiment adds the segment at block 439, otherwise a placeholder volume is created and associated with the new segment at block 438. For example, one planar segment not associated with any existing object is not enough to define an entire volume, however a placeholder may be determined so that when enough additional supporting planar segments are discovered the volume may be fully determined.

At block 440, the embodiment checks tracked segments and updates confidence based on visibility. For example, 3DOS may extract all segments from a current frame and form data association between the current segments and previously tracked segments.

At block 450, the embodiment updates volumes or objects depending on confidence. For example, the planar segment may be combined with a prior discovered planar segment in order to form a surface that is hypothesized as containing a volume or object. If the planar segment is a supporting planar segment, the volume supported by the planar segment receives an increase in confidence at block 450. Otherwise, the embodiment restarts or continues to process the next extracted planar segment after restarting at block 405.

At block 455, when the confidence threshold for a supporting volume reaches a predetermined threshold, the volume is determined as likely to exist and a bounding box is output or displayed at block 460.

Figure 4B:
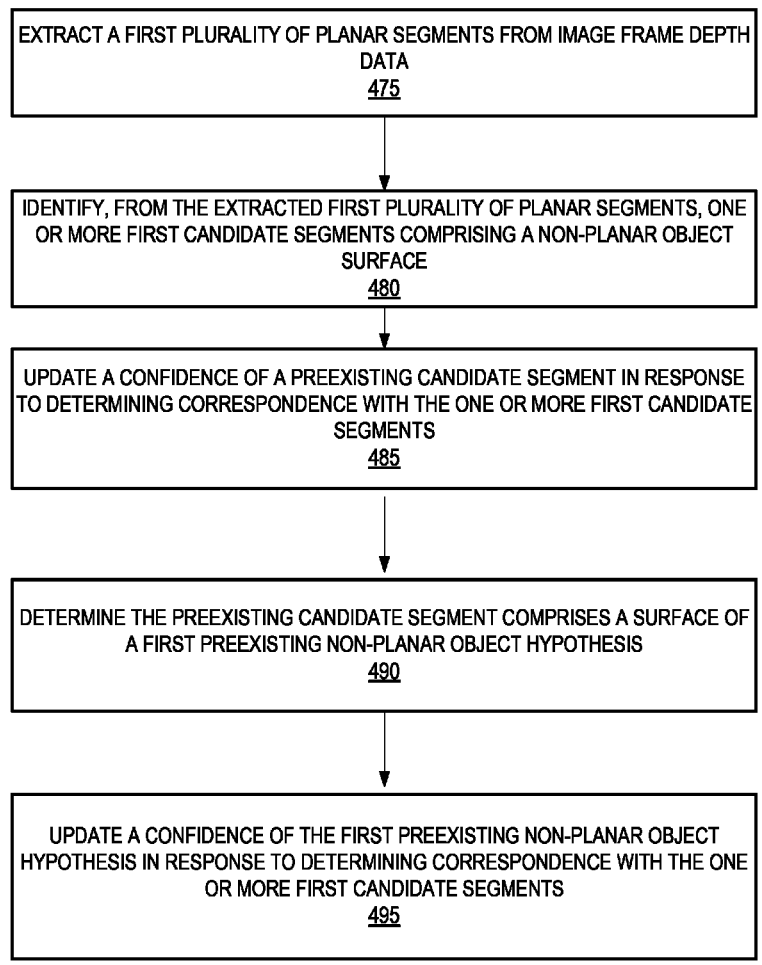
FIG. 4B is a block diagram of a method to perform 3DOS, in another embodiment.

FIG. 4B is a block diagram of a method for performing 3DOS, in another embodiment. At block 475, the embodiment (e.g., as performed by device 100 implementing 3DOS as described herein) extracts a first plurality of planar segments from image frame depth data. For example, the image frame depth data may be from depth camera 115.

At block 480 the embodiment identifies, from the extracted first plurality of planar segments, one or more first candidate segments comprising a non-planar object surface. In one embodiment, identifying a respective candidate segment includes determining one or more of: whether an absolute size of the respective candidate segment is larger than a first threshold and smaller than a second threshold, whether a ratio between a first and second principal component of a point cloud associated with the respective segment is smaller than a third threshold, whether an angle between a camera principal axis and a segment normal is greater than fourth threshold, or any combination thereof.

As used herein, a candidate segment refers to a specific planar segment which satisfies a set of conditions for the segment to be considered as potentially belonging to a surface of a non-planar 3-dimensional object. For example, the conditions may be associated with segment area and dimensions and related to what is also called herein a "non-planar object." For example, the specific candidate segment size and dimensions that define a candidate segment may depend on the type of objects which are to be considered "non-planar 3-dimensional objects."

At block 485, the embodiment updates a confidence of a preexisting candidate segment in response to determining correspondence with the one or more first candidate segments. In one embodiment, correspondence between a respective candidate segment and the preexisting non-planar object is determined according to one or more of: a proximity between the respective candidate segment and a center of volume of the preexisting non-planar object, a volumetric intersection between a volume of the preexisting non-planar object and a volume extended from the respective candidate segment in a direction away from a camera, a volumetric union between two volumes, or any combination thereof. The direction away from a camera may be either: along a camera principal axis, or along a normal to the respective candidate segment.

In one embodiment, confidence in the preexisting candidate segment is updated based on one or more of: a number of depth frames where the preexisting candidate segment surface was expected to be visible, and has at least one first segment correspondence, a size of the overlap (e.g., Intersection Over Union (IoU)) between the existing candidate segment and all the corresponding first segments, a size and shape of the one or more first corresponding segments, a number of depth frames where a preexisting candidate segment surface was expected to be visible (e.g., according to a camera pose and the known occlusions), and there are no corresponding first segments, or any combination thereof.

At block 490, the embodiment determines the preexisting candidate segment comprises a surface of a first preexisting non-planar object hypothesis.

At block 495, the embodiment updates a confidence of the first preexisting non-planar object hypothesis in response to determining correspondence with the one or more first candidate segments. In one embodiment, correspondence between two or more candidate segments is according to one or more of: a distance between planar segments or convex hulls of the two or more candidate segments to compare, an angle between corresponding planes of the two or more candidate segments to compare, an overlap measure (IoU) between a first segment and a projection of the first segment onto a plane defined by a second segment, wherein the first and second segments are the two or more candidate segments to compare, or any combination thereof. The distance between planar segments or convex hulls of the two or more candidate segments to compare may for example be computed as a sum of distances between the vertices of the hull of a first segment and the plane defined by the second segment, and vice versa.

In one embodiment, 3DOS identifies, from the first candidate segments, one or more second candidate segments without correspondence to any preexisting candidate segments and determines correspondence between the one or more second candidate segments and a second non-planar object hypothesis. 3DOS can also update a confidence in the second non-planar object hypothesis in response to determining correspondence between the one or more second candidate segments and a second non-planar object hypothesis and add the one or more second candidate segments to a list of segments comprising the second non-planar object hypothesis.

In one embodiment, the confidence in the second non-planar object hypothesis is based on one or more of: a number of candidate segments currently listed as comprising a surface of the second non-planar object hypothesis, confidence in candidate segments currently listed as comprising a surface of the second non-planar object hypothesis, a size of overlap of the volumes in space defined by the candidate segments exceeding a threshold of confidence, object volume size, proximity of the non-planar object hypothesis to other geometric primitives extracted from the environment, wherein the geometric primitives are one or more of: other objects, or larger planar segments (e.g., large planar surfaces of an object).

In one embodiment, 3DOS creates a new non-planar object hypothesis including one or more third candidate segments having no correspondence to either: previously determined candidate segments, or preexisting non-planar object hypotheses.

In one embodiment, 3DOS provides, in response to determining the confidence in the second non-planar object hypothesis meets a threshold object confidence, one or both of: a representation of a 3D boundary encompassing the object volume, or volume occupancy information.

In one embodiment, 3DOS removes the preexisting candidate segment from a list of preexisting segments when confidence in the preexisting candidate segment drops below a threshold. 3DOS may also remove the preexisting non-planar object hypothesis when confidence in the preexisting object hypothesis drops below a threshold.

In one embodiment, 3DOS detects a change in a number or confidence of candidate segments comprising a surface of the preexisting non-planar object hypothesis, and updates, in response to detecting the change, volume size, shape and occupancy properties associated with the preexisting non-planar object hypothesis.

Figure 5:
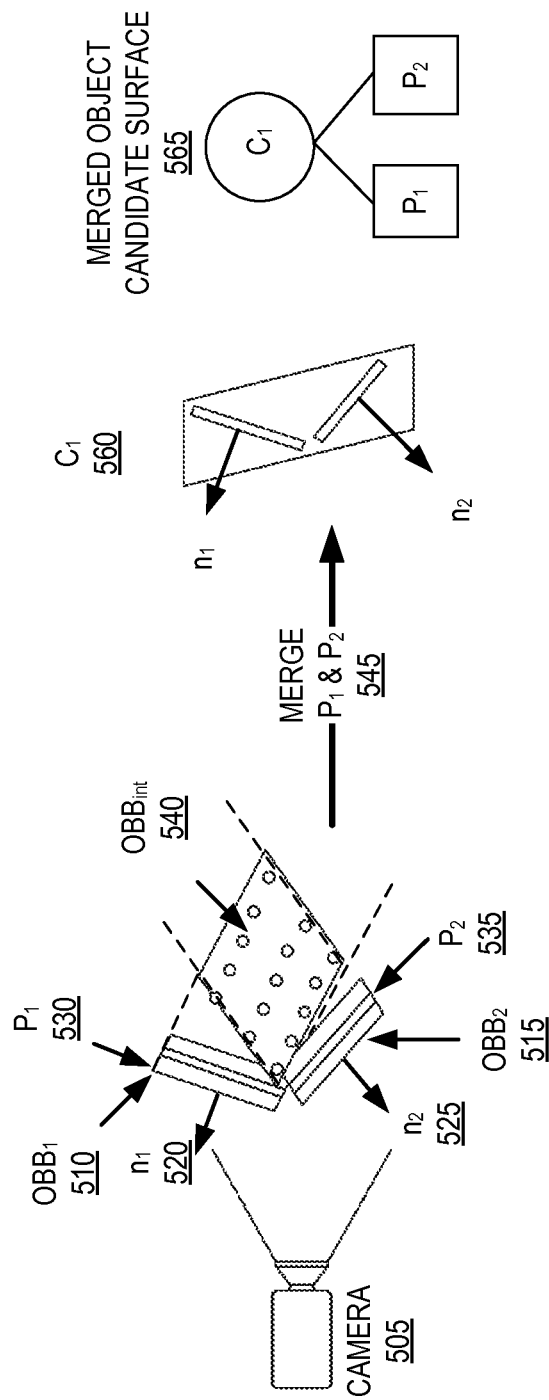
FIG. 5 illustrates two planar segments that support a volume, in one embodiment.

FIG. 5 illustrates two planar segments that support a volume, in one embodiment. As illustrated in FIG. 5, camera 505 sees planar segments $P_1$ 530 and $P_2$ 535. $P_1$ 530 and $P_2$ 535 may be the surfaces of a cup (e.g., Cup 430), vase, cylinder, or other object. Extending $P_1$ 530 and $P_2$ 535 into the invisible area along the normal along this planar segment results in a volume hypothesis $OBB_{int}$ 540 that extends $P_1$ 530 and $P_2$ 535. The intersection of these volumes may be a candidate for an object. When a sufficient number (e.g., a configurable threshold) of planes observations of planes are found to support a volume (e.g., a number of supporting planes) 3DOS forms a hypothesis that there is an object (e.g., $C_1$ 560). In the illustrated example of FIG. 5, $P_1$ and $P_2$ are two planar segments (surfaces) to support $C_1$ as merged object hypothesis surface 565. For supporting planar segments (surfaces), the normal (e.g., n1 520 and n2 525) points towards the camera (e.g., camera 505) otherwise the surface would not be visible. By extending the surface of $P_1$ 530 and $P_2$ 535 in the opposite direction of the normal 3DOS can hypothesize there is a volume along that line that is occupied. Therefore, in one embodiment, 3DOS leverages the planar segments determined from the depth data to aggregate information about a volume that forms the object hypothesis. Extending the surfaces along the (opposite of the) normal direction is another strategy. Another strategy may be to extend the segment Pi along the z-axis (i.e., the camera optical axis) in the frame in which the segment Pi was first observed/introduced. There may be other strategies too, for example to extend surface P1 in a direction parallel to surface P2, etc.

Figure 6:
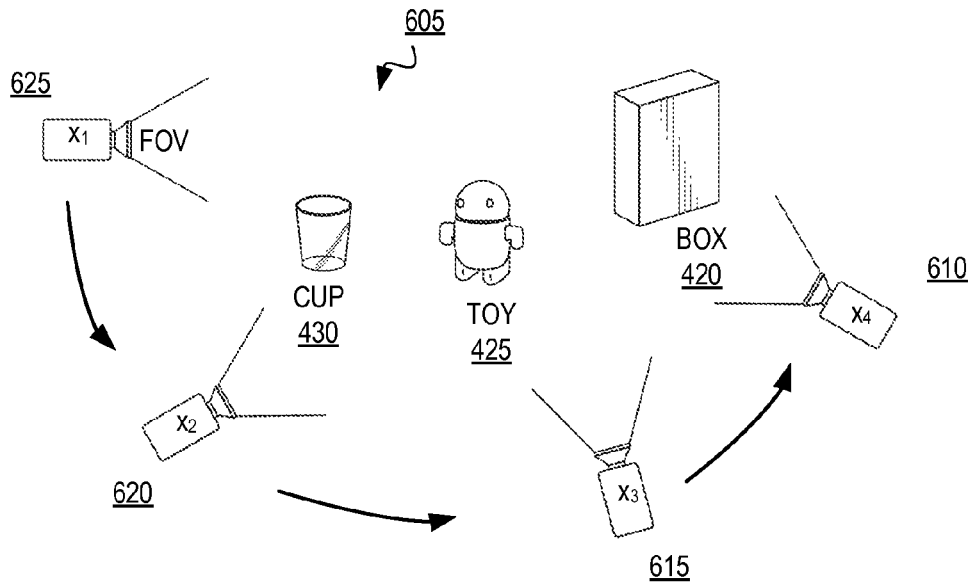
FIG. 6 illustrates a camera capturing multiple angles of a set of 3D objects for use in 3DOS, in one embodiment.

FIG. 6 illustrates a camera capturing multiple angles of a set of 3D objects for use in 3DOS, in one embodiment. For example, a camera at locations $X_{is}$ may see various different planar segments to support the volumes of the three illustrated non-planar objects Cup 430, Toy 425, and Box 420. For each of the non-planar 3D objects, all the camera viewpoints 610-625 can provide support for each of their volumes, and confidence in the volume will increase with each additional viewpoint. In one embodiment, planar segments that satisfy the conditions/thresholds necessary to be considered belonging to a surface of a non-planar 3D object may be referred to herein more specifically as candidate segments.

Figure 7:
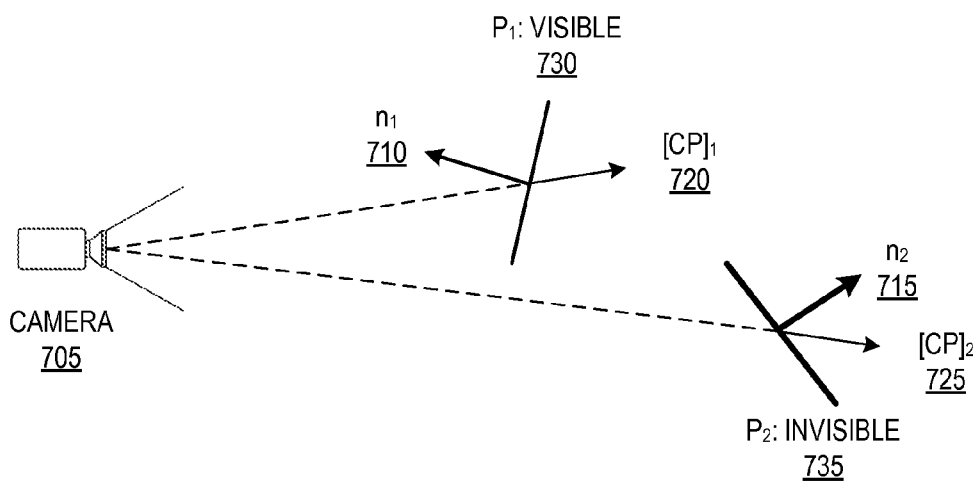
FIG. 7 illustrates the difference in normal relative to the camera for visible and invisible planar segments, in one embodiment.

FIG. 7 illustrates the difference in normal relative to the camera for visible and invisible planar segments, in one embodiment. For example, camera 705 is able to see planar segment $P_1$ 730 when the normal $n_1$ 710 is facing the camera view. However, planar segment $P_2$ 735 is not visible from the camera position 705 because the normal $n_2$ 715 is facing away from the camera.

In some embodiments, 3DOS filters the planar segments that form the support for the volume. Therefore, planar segments may be classified as noise and may be discarded from consideration in forming a particular volume. For example, erroneous or stray planar segments may occur in the system. By checking additional frames for support, erroneous surfaces may be eliminated. Another common source of "fictitious" surfaces stems from tracking errors. If an error in tracking is significant, then a previously observed surface will be "pushed/displaced" too far from its actual location in space. This surface may remain in the system for a while, but it will not be supported by further observations, and also possibly will not correspond to any existing volumes. Therefore, the 3DOS system can seamlessly self-correct minor tracking errors that are not persistent over time (e.g., errors occurring in bursts, which may be a common case). If there is a planar segment (surface) that was initially supporting the volume but was never observed again, 3DOS may drop the surface and attempt to support the volume using other known supporting planes. For example, plane $P_1$-$P_N$ supports a first volume, however $P_1$ may not be supported in more than two frames. 3DOS can keep track of camera frustum (e.g., field of view of the camera) and keep track of each one of the planar segments that should be visible or not in the current camera view. When the camera is pointed away from a particular surface, that surface will not be penalized for not being visible as a supporting plane because the surface would not be expected in the particular view.

If the surface should be visible in a view but is not detected, 3DOS may downgrade the surface until the confidence is so low that the surface is dropped as a supporting surface for the volume. For example, if $P_1$ is not supported, then $P_2$-$P_N$ will form the remaining support for the volume. In one embodiment, 3DOS keeps track of the confidence of volume occupancy with a binary Bayesian filter. For example, 3DOS can use the Bayesian filter to count for each one of the volumes and each of the supporting surfaces of the volumes, how many times the surface was seen compared to how many times the surface was expected to be seen.

In one embodiment, when there are enough (e.g., a configurable number such as two or more) planes observations (e.g., supporting surfaces/planes) that can extend to intersect to create a volume, 3DOS can declare a volume as likely present at that location. Hypothesized volumes may be tracked with their supporting planes. In one embodiment, 3DOS tracks planar segments when they intersect to form a volume (e.g., a concatenation of planes that are observed from multiple viewpoints). From an initial camera viewpoint, 3DOS may only see a first plane, additional planes may eventually be observed to reach a threshold number of planes observed so a volume may be hypothesized. In some embodiments, each supporting plane may be defined by parameters and a contour that describes the boundaries of the segment. In some embodiments, when a volume reaches a threshold confidence level a bounding box around the volume may be output to a display or screen. In other embodiments, while 3DOS discovers additional supporting planes for a volume, the shape or dimensions of the bounding box may change to adjust to what is discovered. As used herein occupancy may be used to describe a volume behind the plane.

Figure 8:
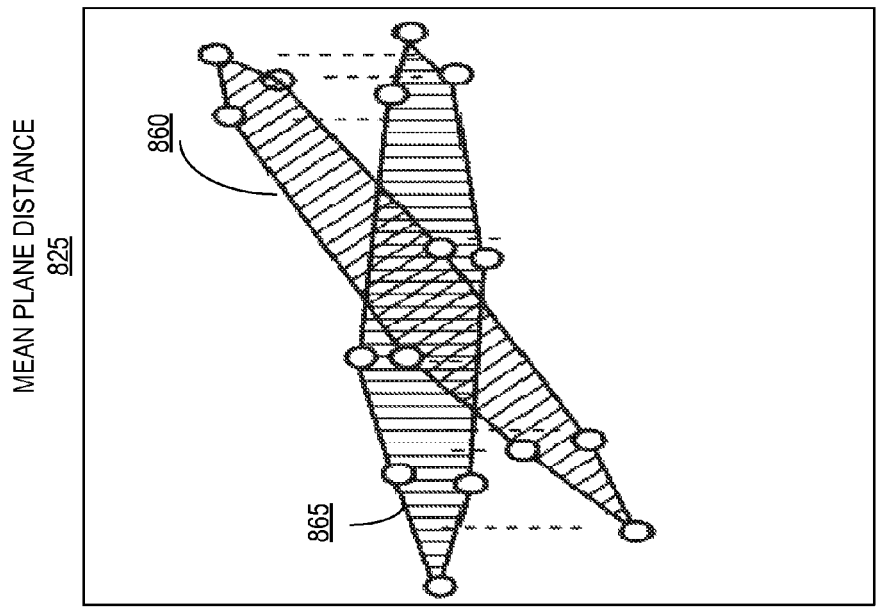
FIG. 8 illustrates a use of hull overlap ratio to track of occupancy confidence, in one embodiment.
Figure 8:
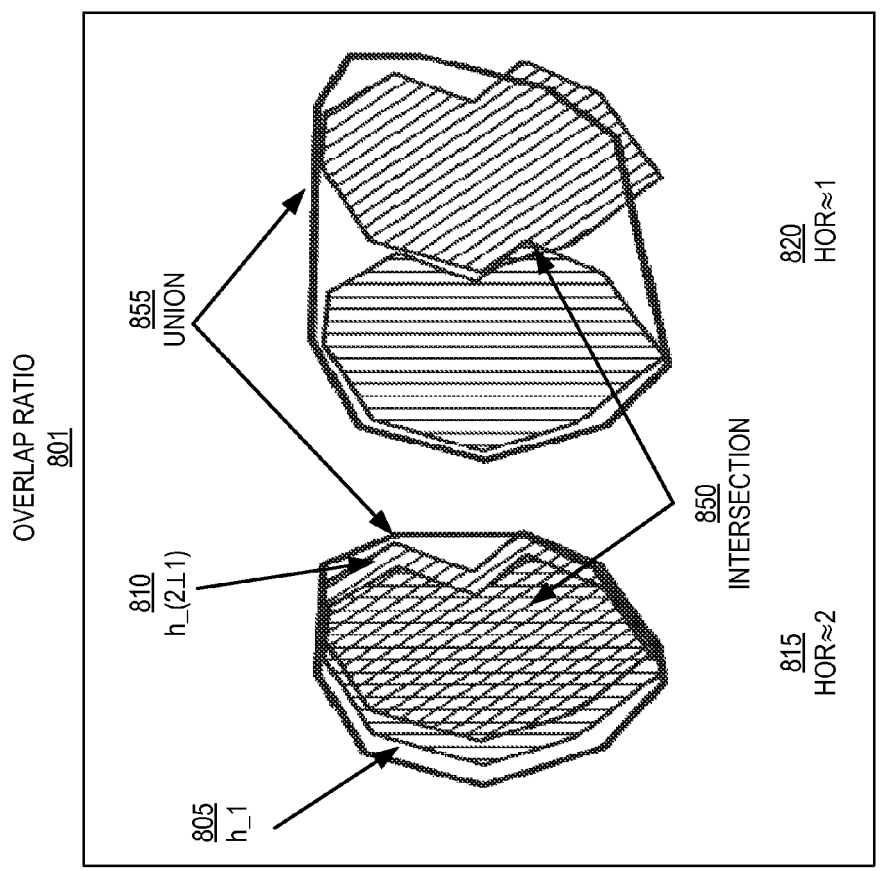

In one embodiment, 3DOS uses data association and metrics as part of the determination for forming a hypothesis for a volume. FIG. 8 illustrates a hull overlap ratio to track of occupancy confidence, in one embodiment. For example, FIG. 8 illustrates a use of hull overlap ratio to form data association between the planar segments observed in different time or camera instances. As illustrated in FIG. 8, 3DOS may compare the area of the intersection 850 between two planes to the area of the union 855 between the two planar segments as part of determining whether planar segment h1 observed in frame n corresponds to planar segment h2 observed in frame m. As illustrated in FIG. 8, a polygon may be projected onto a plane of another polygon. Projecting the first polygon onto the second may yield a Hull Overlap Ratio (HOR) is close to 1 (e.g., 820) meaning that the sum of the individual segment areas is roughly equal to the area of the union of these segments. When the HOR is close to 1, the two planar segments may be considered not very close to each other. Alternatively, when the HOR is closer to 2 (e.g., 815), the two planar segments are very close to each other. 3DOS can use the HOR to detect the same plane in different frames. For example, the HOR may be determined by:

$$HOR = \frac{\text{area}(h\_1) + \text{area}(h\_(2 \perp 1))}{\text{area}[\text{union}(h\_1 \cup h\_(2 \perp 1))]} \qquad \text{Eq. 1}$$

In another embodiment, 3DOS calculates the difference of the normal between two segments to determine whether each segment likely (e.g., determined by a threshold confidence) corresponds to the same plane (e.g., according to angle between normal).

The illustration 825 shows the measurement distance between two polygons in 3D space. One polygon may be used as the reference plane (e.g., 865) and the vertices of another polygon (860) may be extracted. The vertices of the comparison polygon may be used to calculate the distances to the plane of the reference polygon and take the mean of these distances. For example, the equation to calculate the distances may be:

$$d = [E_{k=1}^n d(h(1,k), P2)]/n. \qquad \text{Eq. 2}$$

where h(1,k)=point in a 3D hull of P1.

In one embodiment, when 3DOS determines a first planar segment from a first frame corresponds to a second planar segment from a second frame, the confidence increases that the planar segment exists and indicates the planar segment was not detected in error. 3DOS may also update the actual normal for the planar segment in response to detecting the correspondence between two frames. For example, if 3DOS detects two slightly different normals that are determined as corresponding to the same planar segment, 3DOS can average the two normals and use the average value as the new or updated normal value. In addition to updating normal information, the polygon information may be updated as well. For example, after successful data association of segment $P_n$ to an existing segment $P_1$, the intrinsics of segment $P_1$ are updated using the information from $P_n$, such that the normal of $P_1$ and the boundary/polygon of $P_1$ are updated.

In one embodiment, Mapping module 345 leverages camera pose and intrinsics for information of where a plane is in 3D space for a respective observation.

Figure 9A:
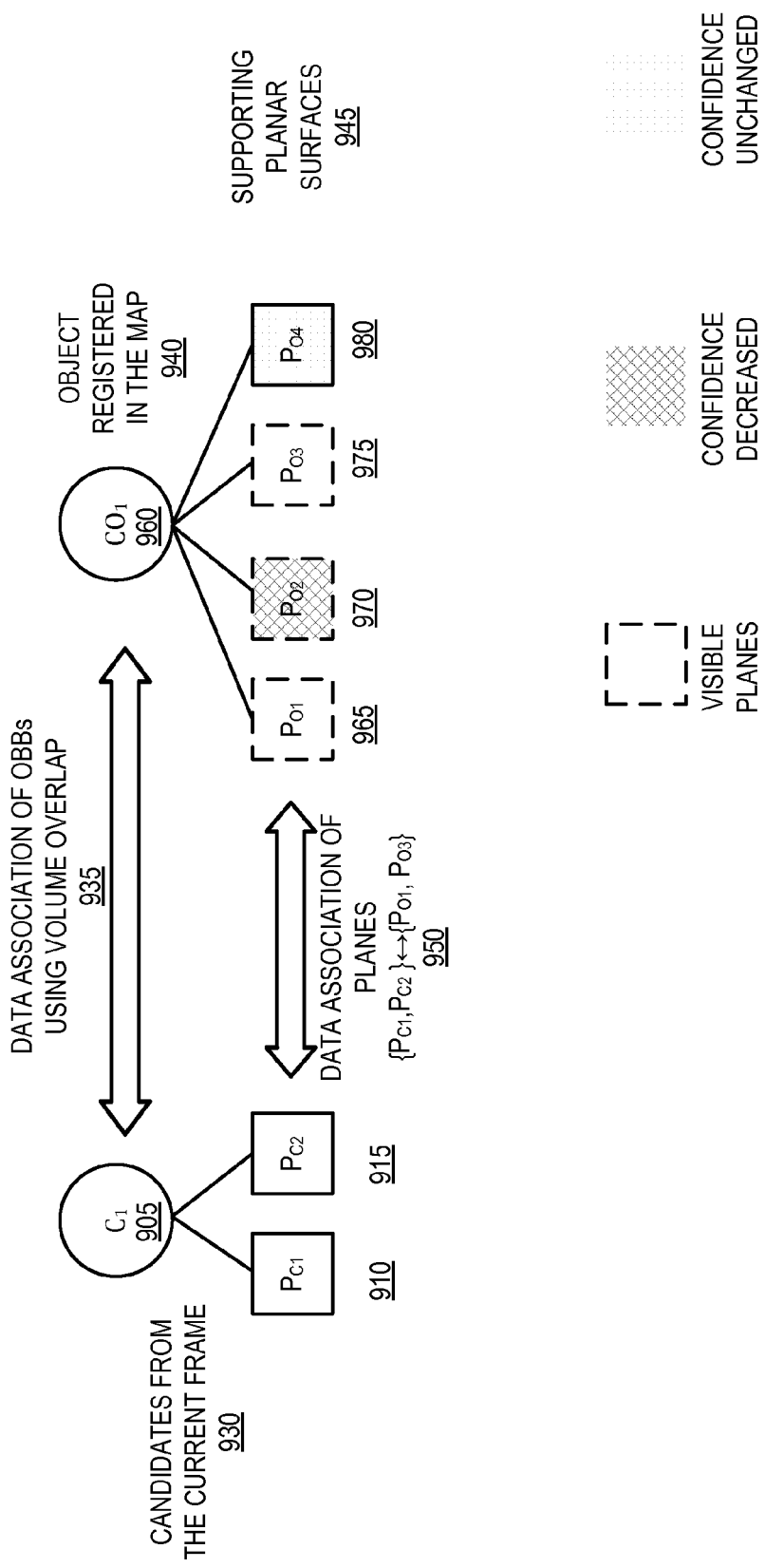
FIGS. 9A and 9B illustrate the results from updating the shape of a volume from a current frame, in one embodiment.
Figure 9B:
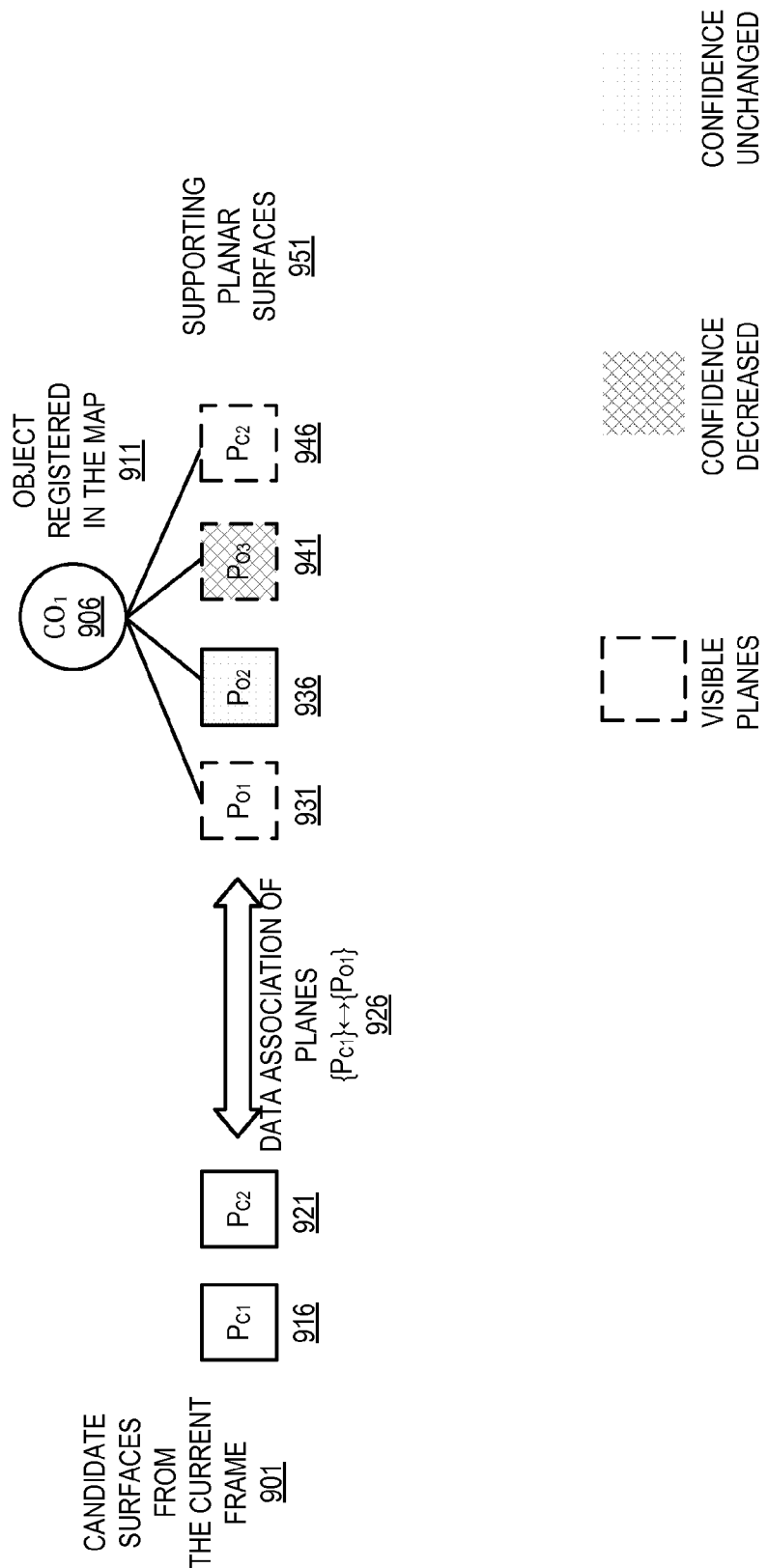

FIGS. 9A and 9B illustrate the results from updating the shape of a volume from a current frame, in one embodiment. For example, observations from the current frame 930 may be compared to the existing elements already registered in the map 960. Visibility testing may be used for filtering surfaces that are not seen from a particular camera viewpoint, and therefore should not be penalized as an erroneous or irrelevant planar segment. As illustrated in FIG. 9A, object hypothesis $C_1$ 905 is found to correspond to registered object $CO_1$ 960, while the supporting planes $P_{C1}$ 910 and $P_{C2}$ 915 are found to correspond to supporting planes $P_{O1}$ 965 and $P_{O3}$ 975 of the registered object $CO_1$ 960 (e.g., planar segments (surfaces) seen in previous frames or observations as detected from the HOV, normal calculation, or other method) within the object registered in the map 940. Therefore, as a result, the confidence or likelihood for the planar segments $P_{O1}$ 965 and $P_{O3}$ 975 may be adjust upwards/increased. In the same figure, surface $P_{O2}$ 970 is a previously registered segment in support of object $CO_1$ which should be visible in the current frame, but no correspondence was found in support of it. Thus its confidence or likelihood is adjusted downwards/decreased. Finally, surface $P_{O4}$ 980 is an example of the previously registered segment in support of object $CO_1$ 960 which should not be visible in the current frame according to the current camera frustum. The confidence of $P_{O4}$ 980 is not adjusted.

Although $P_{C1}$ and $P_{C2}$ in FIG. 9A are surfaces previously seen, any surface that by its shape and orientation and location in space supports the volume can increase the likelihood or confidence of the volume. For example, as illustrated in FIG. 9B, two candidate surfaces $P_{C1}$ 916 and $P_{C2}$ 921 are candidate surfaces extracted in the current frame 901. $P_{C1}$ 916 and $P_{C2}$ 921 may or may not be mutually linked through an object hypothesis. Using the data association 926 3DOS determines $P_{C1}$ 916 corresponds to a supporting plane $P_{O1}$ 931 of the registered object $CO_1$ 906. In contrast, $P_{C2}$ 1070 is illustrated as not being found to immediately correspond to any of the registered surfaces of object $CO_1$ 906. However, extending the surface $P_{C2}$ 921 it is found to support the object $CO_1$ 906, and thus it is added to its list of supporting surfaces. As illustrated in FIG. 9B, the confidence of $P_{O2}$ 936 is unchanged since it is not visible in the current frame. The confidence of $P_{O3}$, 941 is decreased since it should have been visible in the current frame, but was not supported by the observations. The surfaces and volumes will be working in parallel at the same time. As illustrated in FIG. 9A and FIG. 9B, there may be multiple surfaces that support a volume (e.g., $P_{O1}$ through $P_{O4}$). In one embodiment, 3DOS maintains the association of all supporting planar segments and objects in order to keep track of the shape of the volume being occupied. When some of the surfaces are removed due to lack of likelihood or confidence, the shape of the bounding box may change accordingly.

In some embodiments, a user may provide adjustments or edits to the output bounding boxes. For example, in real time a user can provide input that can be fused with real depth measurements. In some embodiments, additional weight or confidence may be given to user initiated edits or adjustments to bounding boxes.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Movement of the device 100 and camera 114 can cause the display to update, in real-time, an augmentation of a target (e.g., one or more objects or scenes) in the SLAM Map. With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera 114 pose).

In one embodiment, an object or graphic may be inserted or integrated into a video stream (or image) captured by the camera 114 and displayed on display 112. 3DOS may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by 3DOS. For example, an animated object can "move" within a scene depicted in the augmented reality display. A person of skill in the art will recognize that embodiments described herein can be implemented in ways other than AR (e.g., robot positioning).

3DOS may be implemented as software, firmware, hardware, module or engine. In one embodiment, the previous 3DOS description may be implemented by the general purpose processor 161 in device 100 to achieve the previously desired functions. In one embodiment, 3DOS may be implemented as an engine or module which may include a Mapping module 171, Tracking module 173, and Depth Processing module 175 as subcomponents. In other embodiments, features of one or more of the described subcomponents may be combined or partitioned into different individual components, modules or engines.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in data processing device containing hardware (e.g., hardware 162), software (e.g., software 165), firmware (e.g., firmware 163), or any combination thereof. If implemented in software as a computer program product, the functions or modules may be stored on or transmitted over as one or more instructions or code on a computer-readable media (e.g., non-transitory machine-readable storage medium). Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for segmenting objects from a real-world environment, the method comprising:
   extracting a first plurality of planar segments from image frame depth data;
   identifying, from the extracted first plurality of planar segments, one or more first candidate segments comprising a non-planar object surface;
   updating a confidence of a preexisting candidate segment in response to determining correspondence with the one or more first candidate segments;
   determining the preexisting candidate segment comprises a surface of a first preexisting non-planar object hypothesis; and
   updating a confidence of the first preexisting non-planar object hypothesis in response to determining correspondence with the one or more first candidate segments, wherein the confidence of the first preexisting non-planar object hypothesis indicates a likelihood of the first preexisting non-planar object occupying a volume.

2. The method of claim 1, further comprising:
   identifying, from the first candidate segments, one or more second candidate segments without correspondence to any preexisting candidate segments;
   determining correspondence between the one or more second candidate segments and a second non-planar object hypothesis;
   updating a confidence in the second non-planar object hypothesis in response to determining correspondence between the one or more second candidate segments and a second non-planar object hypothesis; and
   adding the one or more second candidate segments to a list of segments comprising the second non-planar object hypothesis.

3. The method of claim 2, wherein correspondence between a respective candidate segment and the preexisting non-planar object is determined according to one or more of:
   a proximity between the respective candidate segment and a center of volume of the preexisting non-planar object,
   a volumetric intersection between a volume of the preexisting non-planar object and a volume extended from the respective candidate segment in a direction away from a camera, either: along a camera principal axis, or along a normal to the respective candidate segment,
   a volumetric union between two volumes, or
   any combination thereof.

4. The method of claim 1, wherein the confidence in the preexisting candidate segment is updated based on one or more of:
   a number of depth frames where a surface of the preexisting candidate segment was expected to be visible, and has at least one first segment correspondence,
   a size of an overlap between the existing candidate segment and all the corresponding first segments,
   a size and shape of the one or more first corresponding segments,
   a number of depth frames where a preexisting candidate segment surface was expected to be visible, and there are no corresponding first segments, or
   any combination thereof.

5. The method of claim 2, wherein the confidence in the second non-planar object hypothesis is based on one or more of:
   a number of candidate segments currently listed as comprising a surface of the second non-planar object hypothesis,
   confidence in candidate segments currently listed as comprising a surface of the second non-planar object hypothesis,
   a size of overlap of the volumes in space defined by the candidate segments exceeding a threshold of confidence,
   object volume size,
   proximity of the non-planar object hypothesis to other geometric primitives extracted from the environment, wherein the geometric primitives are one or more of: other objects, or larger planar segments.

6. The method of claim 1, further comprising:
   creating a new non-planar object hypothesis comprising one or more third candidate segments having no correspondence to either:
   previously determined candidate segments, or
   preexisting non-planar object hypotheses.

7. The method of claim 1, wherein identifying a respective candidate segment
comprises determining one or more of:
   whether an absolute size of the respective candidate segment is larger than a first threshold and smaller than a second threshold,
   whether a ratio between a first and second principal component of a point cloud associated with the respective segment is smaller than a third threshold,
   whether an angle between a camera principal axis and a segment normal is greater than fourth threshold, or
   any combination thereof.

8. The method of claim 1, wherein correspondence between two or more candidate segments is according to one or more of:
   a distance between planar segments or convex hulls of the two or more candidate segments to compare,
   an angle between corresponding planes of the two or more candidate segments to compare,
   an overlap measure between a first segment from the two or more candidate segments and a projection of the first segment onto a plane defined by a second segment from the two or more candidate segments, or
   any combination thereof.

9. The method of claim 2, further comprising:
   providing, in response to determining the confidence in the second non-planar object hypothesis meets a threshold object confidence, one or both of:
   a representation of a 3D boundary encompassing an object volume for the second non-planar object hypothesis, or
   volume occupancy information of the second non-planar object hypothesis.

10. The method of claim 1, further comprising:
removing the preexisting candidate segment from a list of preexisting segments when confidence in the preexisting candidate segment drops below a threshold; and
removing the preexisting non-planar object hypothesis when confidence in the preexisting non-planar object hypothesis drops below a threshold.

11. The method of claim 1, further comprising:
detecting a change in a number or confidence of candidate segments comprising a surface of the preexisting non-planar object hypothesis; and
updating, in response to detecting the change, volume occupancy properties associated with the preexisting non-planar object hypothesis.

12. A machine readable non-transitory storage medium having stored therein program instructions that are executable by a processor to:
extract a first plurality of planar segments from image frame depth data;
identify, from the extracted first plurality of planar segments, one or more first candidate segments comprising a non-planar object surface;
update a confidence of a preexisting candidate segment in response to determining correspondence with the one or more first candidate segments;
determine the preexisting candidate segment comprises a surface of a first preexisting non-planar object hypothesis; and
update a confidence of the first preexisting non-planar object hypothesis in response to determining correspondence with the one or more first candidate segments wherein the confidence of the first preexisting non-planar object hypothesis indicates a likelihood of the first preexisting non-planar object occupying a volume.

13. The medium of claim 12, further comprising instructions to:
identify, from the first candidate segments, one or more second candidate segments without correspondence to any preexisting candidate segments;
determine correspondence between the one or more second candidate segments and a second non-planar object hypothesis;
update a confidence in the second non-planar object hypothesis in response to determining correspondence between the one or more second candidate segments and a second non-planar object hypothesis; and
add the one or more second candidate segments to a list of segments comprising the second non-planar object hypothesis.

14. The medium of claim 13, wherein correspondence between a respective candidate segment and the preexisting non-planar object is determined according to one or more of:
a proximity between the respective candidate segment and a center of volume of the preexisting non-planar object,
a volumetric intersection between a volume of the preexisting non-planar object and a volume extended from the respective candidate segment in a direction away from a camera, either: along a camera principal axis, or along a normal to the respective candidate segment,
a volumetric union between two volumes, or
any combination thereof.

15. The medium of claim 12, wherein the confidence in the preexisting candidate segment is updated based on one or more of:
a number of depth frames where a surface of the preexisting candidate segment was expected to be visible, and has at least one first segment correspondence,
a size of an overlap between the existing candidate segment and all the corresponding first segments,
a size and shape of the one or more first corresponding segments,
a number of depth frames where a preexisting candidate segment surface was expected to be visible, and there are no corresponding first segments, or
any combination thereof.

16. The medium of claim 13, wherein the confidence in the second non-planar object hypothesis is based on one or more of:
a number of candidate segments currently listed as comprising a surface of the second non-planar object hypothesis,
confidence in candidate segments currently listed as comprising a surface of the second non-planar object hypothesis,
a size of overlap of the volumes in space defined by the candidate segments exceeding a threshold of confidence,
object volume size,
proximity of the non-planar object hypothesis to other geometric primitives extracted from the environment, wherein the geometric primitives are one or more of:
other objects, or larger planar segments.

17. The medium of claim 12, further comprising instructions to:
create a new non-planar object hypothesis comprising one or more third candidate segments having no correspondence to either:
previously determined candidate segments, or
preexisting non-planar object hypotheses.

18. The medium of claim 12, wherein identifying a respective candidate segment
comprises determining one or more of:
whether an absolute size of the respective candidate segment is larger than a first threshold and smaller than a second threshold,
whether a ratio between a first and second principal component of a point cloud associated with the respective segment is smaller than a third threshold,
whether an angle between a camera principal axis and a segment normal is greater than fourth threshold, or
any combination thereof.

19. The medium of claim 12, wherein correspondence between two or more candidate segments is according to one or more of:
a distance between planar segments or convex hulls of the two or more candidate segments to compare,
an angle between corresponding planes of the two or more candidate segments to compare,
an overlap measure between a first segment from the two or more candidate segments and a projection of the first segment onto a plane defined by a second segment from the two or more candidate segments, or
any combination thereof.

20. The medium of claim 13, further comprising instructions to:
provide, in response to determining the confidence in the second non-planar object hypothesis meets a threshold object confidence, one or both of:
a representation of a 3D boundary encompassing an object volume for the second non-planar object hypothesis, or volume occupancy information of the second non-planar object hypothesis.

21. The medium of claim 12, further comprising instructions to:
remove the preexisting candidate segment from a list of preexisting segments when confidence in the preexisting candidate segment drops below a threshold; and
remove the preexisting non-planar object hypothesis when confidence in the preexisting non-planar object hypothesis drops below a threshold.

22. The medium of claim 12, further comprising instructions to:
detect a change in a number or confidence of candidate segments comprising a surface of the preexisting non-planar object hypothesis; and
update, in response to detecting the change, volume occupancy properties associated with the preexisting non-planar object hypothesis.

23. A device to provide 3D object detection, the device comprising:
memory; and
a processor coupled to the memory and configured to:
extract a first plurality of planar segments from image frame depth data;
identify, from the extracted first plurality of planar segments, one or more first candidate segments comprising a non-planar object surface;
update a confidence of a preexisting candidate segment in response to determining correspondence with the one or more first candidate segments;
determine the preexisting candidate segment comprises a surface of a first preexisting non-planar object hypothesis; and
update a confidence of the first preexisting non-planar object hypothesis in response to determining correspondence with the one or more first candidate segments wherein the confidence of the first preexisting non-planar object hypothesis indicates a likelihood of the first preexisting non-planar object occupying a volume.

24. The device of claim 23, further comprising instructions to:
identify, from the first candidate segments, one or more second candidate segments without correspondence to any preexisting candidate segments;
determine correspondence between the one or more second candidate segments and a second non-planar object hypothesis;
update a confidence in the second non-planar object hypothesis in response to determining correspondence between the one or more second candidate segments and a second non-planar object hypothesis; and
add the one or more second candidate segments to a list of segments comprising the second non-planar object hypothesis.

25. The device of claim 23, wherein the confidence in the preexisting candidate segment is updated based on one or more of:
a number of depth frames where a surface of the preexisting candidate segment was expected to be visible, and has at least one first segment correspondence,
a size of an overlap between the existing candidate segment and all the corresponding first segments,
a size and shape of the one or more first corresponding segments,
a number of depth frames where a preexisting candidate segment surface was expected to be visible, and there are no corresponding first segments, or
any combination thereof.

26. The device of claim 24, wherein the confidence in the second non-planar object hypothesis is based on one or more of:
a number of candidate segments currently listed as comprising a surface of the second non-planar object hypothesis,
confidence in candidate segments currently listed as comprising a surface of the second non-planar object hypothesis,
a size of overlap of the volumes in space defined by the candidate segments exceeding a threshold of confidence,
object volume size,
proximity of the non-planar object hypothesis to other geometric primitives extracted from the environment, wherein the geometric primitives are one or more of:
other objects, or larger planar segments.

27. The device of claim 23, wherein correspondence between two or more candidate segments is according to one or more of:
a distance between planar segments or convex hulls of the two or more candidate segments to compare,
an angle between corresponding planes of the two or more candidate segments to compare,
an overlap measure between a first segment from the two or more candidate segments and a projection of the first segment onto a plane defined by a second segment from the two or more candidate segments, or
any combination thereof.

28. An apparatus for performing 3D object detection, the apparatus comprising:
means for extracting a first plurality of planar segments from image frame depth data;
means for identifying, from the extracted first plurality of planar segments, one or more first candidate segments comprising a non-planar object surface;
means for updating a confidence of a preexisting candidate segment in response to determining correspondence with the one or more first candidate segments;
means for determining the preexisting candidate segment comprises a surface of a first preexisting non-planar object hypothesis; and
means for a confidence of the first preexisting non-planar object hypothesis in response to determining correspondence with the one or more first candidate segments, wherein the confidence of the first preexisting non-planar object hypothesis indicates a likelihood of the first preexisting non-planar object occupying a volume.

29. The apparatus of claim 28, further comprising instructions to:
means for identifying, from the first candidate segments, one or more second candidate segments without correspondence to any preexisting candidate segments;
means for determining correspondence between the one or more second candidate segments and a second non-planar object hypothesis;
means for updating a confidence in the second non-planar object hypothesis in response to determining correspondence between the one or more second candidate segments and a second non-planar object hypothesis; and means for adding the one or more second candidate segments to a list of segments comprising the second non-planar object hypothesis.

30. The apparatus of claim 29, wherein the confidence in the preexisting candidate segment is updated based on one or more of:

a number of depth frames where a surface of the preexisting candidate segment was expected to be visible, and has at least one first segment correspondence, a size of an overlap between the existing candidate segment and all the corresponding first segments, a size and shape of the one or more first corresponding segments, a number of depth frames where a preexisting candidate segment surface was expected to be visible, and there are no corresponding first segments, or any combination thereof, and wherein the confidence in the second non-planar object hypothesis is based on one or more of:

a number of candidate segments currently listed as comprising a surface of the second non-planar object hypothesis, confidence in candidate segments currently listed as comprising a surface of the second non-planar object hypothesis, a size of overlap of the volumes in space defined by the candidate segments exceeding a threshold of confidence, object volume size, proximity of the non-planar object hypothesis to other geometric primitives extracted from the environment, wherein the geometric primitives are one or more of: other objects, or larger planar segments.

* * * * *